United States Patent
Ganev et al.

(10) Patent No.: US 9,058,929 B2
(45) Date of Patent: Jun. 16, 2015

(54) COMPOSITE AC-TO-DC POWER CONVERTER WITH BOOSTING CAPABILITIES

(71) Applicant: HONEYWELL INTERNATIONAL, INC., Morristown, NJ (US)

(72) Inventors: Evgeni Ganev, Torrance, CA (US); William Warr, Glendale, CA (US); Keming Chen, Torrance, CA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 116 days.

(21) Appl. No.: 13/938,993

(22) Filed: Jul. 10, 2013

(65) Prior Publication Data

US 2015/0016156 A1    Jan. 15, 2015

(51) Int. Cl.
| | |
|---|---|
| *H02M 1/12* | (2006.01) |
| *H02M 1/14* | (2006.01) |
| *H01F 30/14* | (2006.01) |
| *H02M 7/06* | (2006.01) |
| *H02M 7/08* | (2006.01) |

(52) U.S. Cl.
CPC ............. *H01F 30/14* (2013.01); *H02M 7/066* (2013.01); *H02M 7/068* (2013.01); *H02M 7/08* (2013.01)

(58) Field of Classification Search
USPC .................................. 363/44, 45, 46
See application file for complete search history.

(56) References Cited

U.S. PATENT DOCUMENTS

| | | | |
|---|---|---|---|
| 7,772,953 B2 | 8/2010 | Huang et al. | |
| 2002/0186112 A1* | 12/2002 | Kamath | 336/5 |
| 2005/0035838 A1* | 2/2005 | Owen | 336/5 |
| 2011/0103113 A1* | 5/2011 | Ganev et al. | 363/126 |
| 2011/0216564 A1 | 9/2011 | Swamy | |
| 2013/0094257 A1* | 4/2013 | Warr et al. | 363/64 |
| 2013/0128634 A1* | 5/2013 | Ganev et al. | 363/44 |
| 2013/0170257 A1* | 7/2013 | Ganev et al. | 363/44 |
| 2014/0119073 A1* | 5/2014 | Ganev et al. | 363/64 |

OTHER PUBLICATIONS

Analysis and Design of New Harmonic Mitigation Approaches A Dissertation by Eddy Cristian Aeloiza Matus Submitted to the Office of Graduate Studies of Texas A&M University in partial fulfillment of the requirements for the degree of Doctor of Philosophy.

(Continued)

*Primary Examiner* — Emily P Pham
(74) *Attorney, Agent, or Firm* — Shimokaji IP (57) ABSTRACT

A boosting AC-to-DC converter may include a main rectifier, first and second auxiliary rectifiers, and an autotransformer. The autotransformer may include a plurality of winding assemblies each having a primary terminal connected to an AC power source, a main secondary terminal connected to the main rectifier, a first auxiliary secondary terminal connected to the first auxiliary rectifier, and a second auxiliary secondary terminal connected to the second auxiliary rectifier. Impedance between the primary terminal of each of the winding assemblies and the main rectifier is less than impedance between the primary terminal of each of the winding assemblies and either the first auxiliary rectifier or the second auxiliary rectifier. Impedance between the primary terminal of each of the first winding assemblies and the first auxiliary rectifier is different from impedance between the primary terminal of each of the winding assemblies and the second auxiliary rectifier.

13 Claims, 5 Drawing Sheets

(56) References Cited

OTHER PUBLICATIONS

Analysis of New Step-Up and Step-Down 18-Pulse Direct Asymmetric Autotransformer-Rectifiers Rolando P. Burgos, Alexander Uan-Zo-li, Frederic Lacaux, Arman Roshan, Fred Wang, and Dushan Boroyevich. Center for Power Electronics Systems (CPES) Virginia Polytechnic Institute and State University Blacksburg, VA 24061-0111 rp.burgos@ieee.org.

Eddy Cristian Aeloiza Matus Analysis and Design of New Harmonic Mitigation Approaches A Dissertation Submitted to the Office of Graduate Studies of Texas A&M University in partial fulfillment of the requirements for the degree of Doctor of Philosophy Dec. 2012.

Rolando P. Burgos, Alexander Uan-Zo-Li, Frederic Lacaux, Arman Roshan, Fred Wang, and Dushan Boroyevich. Analysis of New Step-Up and Step-Down 18-Pulse Direct Asymmetric Autotransformer-Rectifiers Center for Power Electronics Systems (CPES) Virginia Polytechnic Institute and State University Blacksburg, VA 24061-0111 0-7803-9208-6/05/$20.00 © 2005 IEEE Jun. 2005.

* cited by examiner

FIG. 5 ns to input AC currents. Typically, lower frequency harmonic distortions may be reduced by employing AC-to-DC converters with high pulse configurations. For example, when conversion of three phase AC power is performed with a 24-pulse converter, harmonic distortions of input power may be maintained at a reasonably low level. Of course, a 24-pulse converter must have a higher number of transformer windings than a 12-pulse or 18-pulse converter. Consequently, 24-pulse converters are typically heavier, larger and more expensive than 12-pulse or 18-pulse converters. Such sizes and weights may be evaluated objectively by considering and expression W/VA: where W is DC power in watts; and VA is the rating of a transformer expressed in volt-amperes. For a typical 18-pulse converter with a 1:2 boosting capability, W/VA may be about 0.5.

COMPOSITE AC-TO-DC POWER CONVERTER WITH BOOSTING CAPABILITIES

BACKGROUND OF THE INVENTION

The present invention generally relates to AC-to-DC converters and more particularly to passive AC-to-DC converters with voltage boosting capability.

AC-to-DC converters play a significant role in the modern aerospace/military industry. This is particularly true in the area of more electric architecture (MEA) for aircraft and spacecraft. Power quality is a major concern for MEA aircraft because of the large number of electric power systems and equipment installed on the same bus. The power quality of these systems and equipment has stringent requirements to ensure that all power supplies/utilization equipment function together properly.

The term "composite AC-to-DC converter" has been coined to distinguish a converter using two or more conversion methods in parallel. The concept for a composite AC-to-DC converter originated as a further improvement towards smaller size, lower weight, and higher efficiency.

While composite AC-to-DC converters present a large step toward performance improvement they have not incorporated efficient boosting capabilities. They typically provide rectification of a three phase 115-Vac system resulting in a typical output voltage value of 270 Vdc. There are many applications where the output voltage is desired to be much higher for a better performance of a consecutive power conditioning. Typical values used in some power distribution systems are 540 Vdc, +/−270 Vdc and 610 Vdc. That means that it would be desirable for a composite AC-to-DC converter, used in a three phase 115-Vac system, to produce output voltage about two times higher at its rectified output. In other words, it would be desirable to provide voltage boosting capability in a composite AC-to-DC converter.

It would be desirable to achieve such voltage boosting passively while introducing only minimal harmonic distortions to input AC currents. Typically, lower frequency harmonic distortions may be reduced by employing AC-to-DC converters with high pulse configurations. For example, when conversion of three phase AC power is performed with a 24-pulse converter, harmonic distortions of input power may be maintained at a reasonably low level. Of course, a 24-pulse converter must have a higher number of transformer windings than a 12-pulse or 18-pulse converter. Consequently, 24-pulse converters are typically heavier, larger and more expensive than 12-pulse or 18-pulse converters. Such sizes and weights may be evaluated objectively by considering and expression W/VA: where W is DC power in watts; and VA is the rating of a transformer expressed in volt-amperes. For a typical 18-pulse converter with a 1:2 boosting capability, W/VA may be about 0.5.

Additionally, it would be desirable to achieve passive voltage boosting employing an autotransformer, as compared to an active semiconductor-based boosting circuit. In the context of aerospace applications inherent reliability of a passive system as compared to an active system is an important consideration.

Within an autotransformer of a composite AC-to-DC converter, interior winding turn ratios are responsible for its voltage boost factor. However a typical autotransformer's conversion ratio (ACR) will begin to decrease when used for voltage boosting. The main cause of a decreasing ACR in a boost topology can be viewed as the autotransformer winding volts*amperes (VA) sum is going up while the autotransformer output power is remaining constant. A high ACR is desirable in an autotransformer used in an aerospace vehicle because such an autotransformer may be constructed with smaller windings and with less weight than an autotransformer having a low ACR.

As can be seen, there is a need for a passive composite AC-to-DC converter with voltage boosting capability. More particularly, there is a need for such a converter that may produce voltage boosting passively with an autotransformer which may operate with a high ACR and with minimal harmonic distortion of input voltage.

SUMMARY OF THE INVENTION

In one aspect of the present invention, a multi-phase AC-to-DC converter may comprise: a main rectifier; a first auxiliary rectifier; a second auxiliary rectifier; and an autotransformer coupled with the main rectifier, the first auxiliary rectifier and the second auxiliary rectifier, the autotransformer including; a first winding assembly including: a primary terminal coupled with an AC power source, a main secondary terminal coupled with the main rectifier, a first auxiliary secondary terminal coupled with the first auxiliary rectifier, and a second auxiliary secondary terminal coupled with the second auxiliary rectifier, wherein operational impedance between the primary terminal and the main secondary terminal is less than operational impedance between the primary terminal and either the first auxiliary secondary terminal or the second auxiliary secondary terminal, and wherein operational impedance between the primary terminal and the first auxiliary secondary terminal is different from operational impedance between the primary terminal and the second auxiliary secondary terminal; a second winding assembly including, a primary terminal coupled with the AC power source, a main secondary terminal coupled with the main rectifier, a first auxiliary secondary terminal coupled with the first auxiliary rectifier, and a second auxiliary secondary terminal coupled with the second auxiliary rectifier, wherein operational impedance between the primary terminal and the main secondary terminal is less than operational impedance between the primary terminal and either the first auxiliary secondary terminal or the second auxiliary secondary terminal and wherein operational impedance between the primary terminal and the first auxiliary secondary terminal is different from operational impedance between the primary terminal and the second auxiliary secondary terminal; and a third winding assembly including, a primary terminal coupled with the AC power source, a main secondary terminal coupled with the main rectifier, a first auxiliary secondary terminal coupled with the first auxiliary rectifier, and a second auxiliary secondary terminal coupled with the second auxiliary rectifier, wherein operational impedance between the primary terminal and the main secondary terminal is less than operational impedance between the primary terminal of the third winding assembly and either the first auxiliary secondary terminal or the second auxiliary secondary terminal and wherein operational impedance between the primary terminal and the first auxiliary secondary terminal is different from operational impedance between the primary terminal and the second auxiliary secondary terminal.

In another aspect of the present invention, an autotransformer for use in an AC to DC converter may comprise: a first winding assembly that includes a plurality of winding segments and at least one tap; a second winding assembly that includes a plurality of winding segments and at least one tap; a third winding assembly that includes a plurality of winding segments and at least one tap; wherein at least one winding segment of the first winding assembly is coupled with the at least one tap of the second winding assembly, wherein at least one winding segment of the second winding assembly is coupled with the at least one tap of the third winding assembly, and wherein at least one winding segment of the third winding assembly is coupled with the at least one tap of the first winding assembly.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide passive composite AC-to-DC converters with voltage boosting capability. More particularly, such converters may produce voltage boosting passively with an autotransformer that operates with a high ACR. Additionally, phase shifting may occur between power applied to a main rectifier and power applied to auxiliary rectifiers. Such converters may produce only minimal low frequency harmonic distortion of input AC current and voltage.

Figure 1:
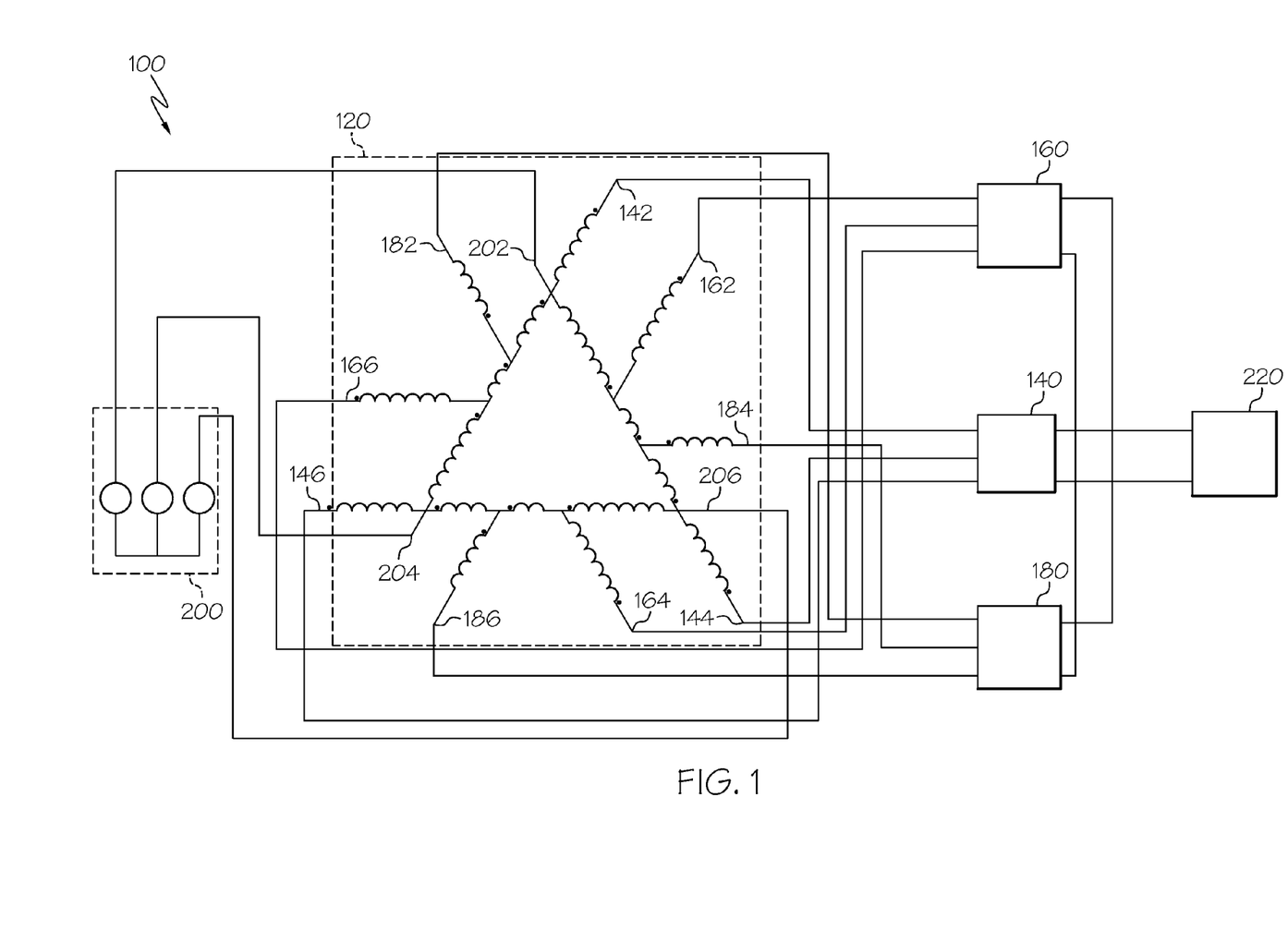
FIG. 1 is a schematic diagram of an AC-to-DC power converter in accordance with an embodiment of the invention.

Referring now to FIG. 1, it may be seen that an exemplary AC-to-DC converter 100 may include an autotransformer 120, a main rectifier 140 and auxiliary rectifiers 160 and 180, In FIG. 1 the converter 100 is shown interconnected between a 3-phase power supply 200 and a DC load 220. The main rectifier 140 and the auxiliary rectifiers 160 and 180 may be conventional 6 pulse rectifiers.

The autotransformer 120 may be connected to the power supply 200 at primary terminals 202, 204 and 206. The main rectifier 140 may be connected to the autotransformer 120 at secondary terminals 142, 144 and 146. The auxiliary rectifier 160 may be connected to the autotransformer 120 at secondary terminals 162, 164 and 166. The auxiliary rectifier 180 may be connected to the autotransformer 120 at secondary terminals 182, 184 and 186.

Figure 2:
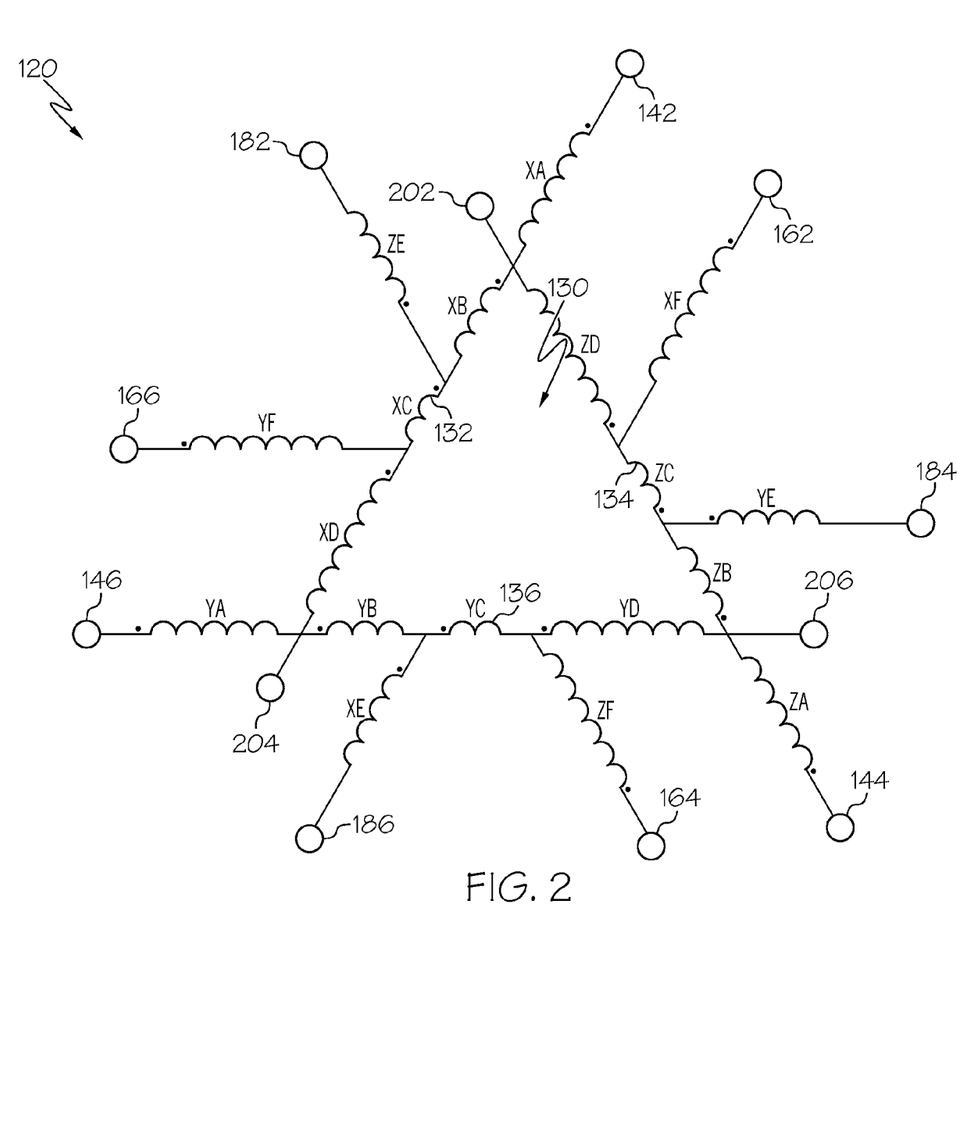
FIG. 2 is a vector-format schematic diagram of an autotransformer of the converter of FIG. 1 in accordance with an embodiment of the invention.
Figure 3:
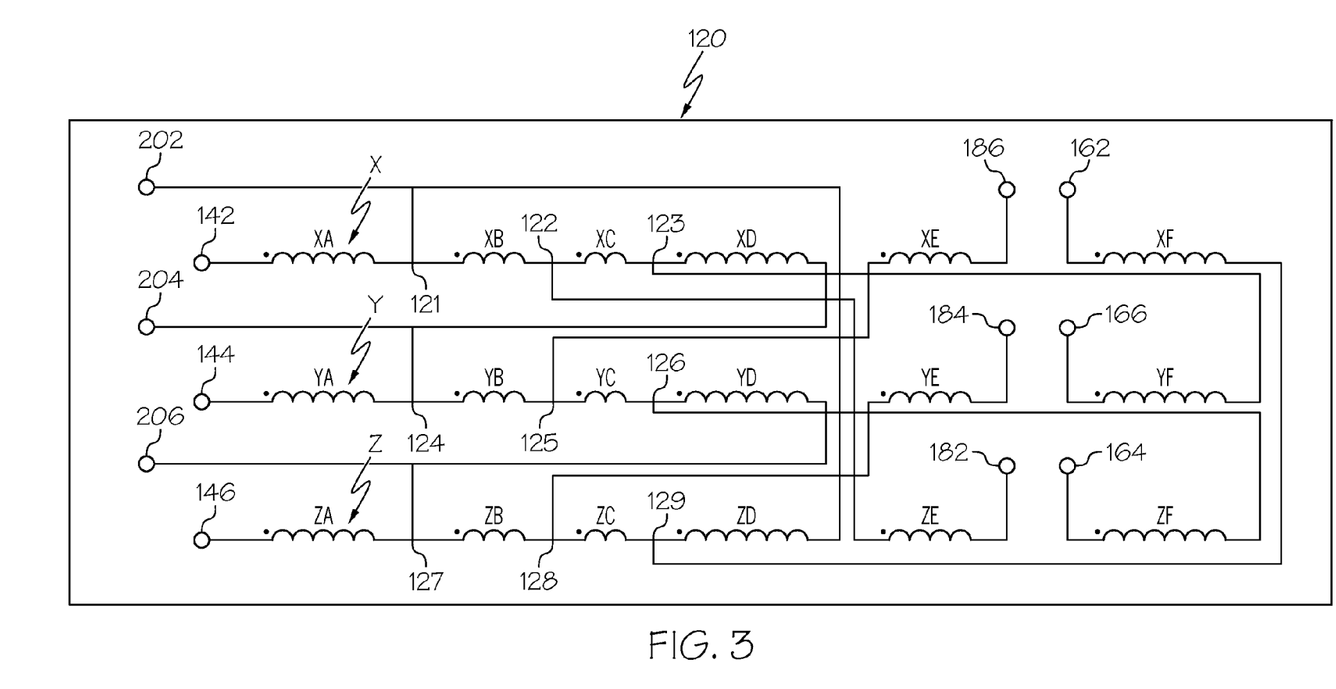
FIG. 3 is a conventional schematic diagram of the autotransformer of the converter of FIG. 1 in accordance with an embodiment of the invention.

Referring now to FIGS. 2 and 3, detailed illustration of interconnections within an exemplary embodiment of the autotransformer 120 are shown. The autotransformer 120 may be constructed with three winding assemblies designated generally as X, Y and Z. The winding assembly X may be wound to include six sequential winding segments designated XA, XB, XC, XD, XE and XF. The winding assembly Y may be wound include six sequential winding segments designated YA, YB, YC, YD, YE and YF. The winding assembly Z may include six sequential winding segments designated ZA, ZB, ZC, ZD, ZE and ZF.

Referring particularly to FIG. 3, the winding segment XA may be connected to the terminal 142 at a point designated X1. The winding segments XA and XB may be connected together at points X2 and X3. A tap 121 may be interposed between the points X2 and X3. The winding segments XB and XC may be connected together at points X4 and X5. A tap 122 may be interposed between the points X4 and X5. The winding segments XC and XD may be connected together at points X6 and X7. A tap 123 may be interposed between the points X6 and X7

The winding segment YA may be connected to the terminal 144 at a point designated Y1. The winding segments YA and YB may be connected together at point Y2 and Y3. A tap 124 may be interposed between the points Y2 and Y3. The winding segments YB and YC may be connected together at points Y4 and Y5. A tap 125 may be interposed between the points Y4 and Y5. The winding segments YC and YD may be connected together at points Y6 and Y7. A tap 126 may be interposed between the points Y6 and Y7

The winding segment ZA may be connected to the terminal 146 at a point designated Z1. The winding segments ZA and ZB may be connected together at point Z2 and Z3. A tap 127 may be interposed between the points Z2 and Z3. The winding segments ZB and ZC may be connected together at points Z4 and Z5. A tap 128 may be interposed between the points Z4 and Z5. The winding segments ZC and ZD may be connected together at points Z6 and Z7. A tap 129 may be interposed between the points Z6 and Z7

The winding assembly X may be interconnected with the winding assembly Y through an interconnection between point X8 and the tap 124 and also through an interconnection between a point X9 and the tap 125. The winding assembly Y may be interconnected with the winding assembly Z through an interconnection between point Y8 and the tap 127 and also through an interconnection between a point Y9 and the tap 128. The winding assembly Z may be interconnected with the winding assembly X through an interconnection between point Z8 and the tap 121 and also through an interconnection between a point Z9 and the tap 122.

The winding segment XE may be connected to the secondary terminal 186 at a point X10. In that regard the winding segment XE may be interposed between the secondary terminal 186 and winding assembly Y. Similarly, the winding segment YE may be connected to the secondary terminal 184 at a point Y10. In that regard the winding segment YE may be interposed between the secondary terminal 186 and winding assembly Z. Also, the winding segment YE may be connected to the secondary terminal 182 at a point Y10. In that regard the winding segment YE may be interposed between the secondary terminal 182 and winding assembly X.

The winding segment XF may be connected to the secondary terminal 162 at a point X11 and connected to the tap 129 at a point X12. In that regard the winding segment XF may be interposed between the secondary terminal 162 and winding assembly Z. Similarly, the winding segment YF may be connected to the secondary terminal 166 at a point Y11 and connected to the tap 123 at a point Y12. In that regard the winding segment YF may be interposed between the secondary terminal 166 and winding assembly X. Also, the winding segment ZF may be connected to the secondary terminal 164 at a point Z10 and connected to the tap 126 at a point Z12. In that regard the winding segment ZF may be interposed between the secondary terminal 164 and winding assembly Y.

Referring now particularly to FIG. 2, the various winding assemblies X, Y and Z are shown in a format consistent with a vector analysis point of view. In that regard a central isosceles triangle 130 may be formed from some of the winding segments. A first side 132 of the triangle 130 may include the winding segments XB, XC and XD of the winding assembly X. A second side 134 of the triangle 130 may include the winding segments YB, YC and YD of the winding assembly Y. A third side 136 of the triangle may include the winding segments ZB, ZC and ZD of the winding assembly Z.

Winding turns ratios of the winding segments may be quantified by considering each of the three triangle sides 132, 134 and 136 to have a unit length. In such a normalized context the winding segments may have winding turns ratios consistent with the following Table 1.

TABLE 1

| Winding Segment | Turns Ratio |
| --- | --- |
| XA | 0.618 |
| XB | 0.1804 |
| XC | 0.0959 |
| XD | 0.7238 |
| XE | 0.4660 |
| XF | 0.6807 |
| YA | 0.618 |
| YB | 0.1804 |
| YC | 0.0959 |
| YD | 0.7238 |
| YE | 0.4660 |
| YF | 0.6807 |
| ZA | 0.618 |
| ZB | 0.1804 |
| ZC | 0.0959 |
| ZD | 0.7238 |
| ZE | 0.4660 |
| ZF | 0.6807 |

In the exemplary embodiment of the converter 100 shown FIG. 1 and the autotransformer of FIGS. 2 and 3, the converter 10 may provide a converter boost of 1.0:2.0 (input to output) with a W/VA of about 0.711. Prior art converters using a typical isolation transformer present 0.5 W/VA. This particular W/A improvement indicates a converter probable size/weight reduction of 29.7%, 1-(0.5/0.711), compared to a prior art boost converter. This improvement may be possible in because of an asymmetric output of this autotransformer. In this configuration, the main rectifier 140 may conduct current for 80 degrees and the two auxiliary rectifier 160 and 180 may conduct 20 degrees each.

The asymmetrical nature of the converter 100 may be illustrated by considering current paths between the AC power supply 200 and the rectifiers 140, 160 and 180. It may be seen that a main current path, designated in Table 2 by the numeral 1002, between primary terminal 202 and secondary terminal 142 (i.e., a terminal of the main rectifier 140) may have relatively low operational impedance as compared to a first auxiliary current path, designated in Table 2 by the numeral 1008, between the primary terminal 202 and the secondary terminal 162 (i.e., a terminal of the auxiliary rectifier 160). A second auxiliary current path, designated in Table 2 by the numeral 1014, between the primary terminal 202 and the secondary terminal 184 (i.e., a terminal of the auxiliary rectifier 180) may have a lower operational impedance than the main current path 1002 and an operational impedance different from the first auxiliary current path 1008. A Table 2 summarizes the various current paths that may exist within the autotransformer 120.

TABLE 2

| Current path number identity | Current path endpoints |
| --- | --- |
| 1002 | Primary terminal 202 to main secondary terminal 142 |
| 1004 | Primary terminal 204 to main secondary terminal 144 |
| 1006 | Primary terminal 206 to main secondary terminal 146 |
| 1008 | Primary terminal 202 to secondary terminal 162 of first auxiliary rectifier 160 |
| 1010 | Primary terminal 204 to secondary terminal 166 of first auxiliary rectifier 160 |
| 1012 | Primary terminal 206 to secondary terminal 164 of first auxiliary rectifier 160 |
| 1014 | Primary terminal 202 to secondary terminal 182 of second auxiliary rectifier 180 |
| 1016 | Primary terminal 204 to secondary terminal 186 of second auxiliary rectifier 180 |
| 1018 | Primary terminal 206 to secondary terminal 184 of second auxiliary rectifier 180 |

Figure 4:
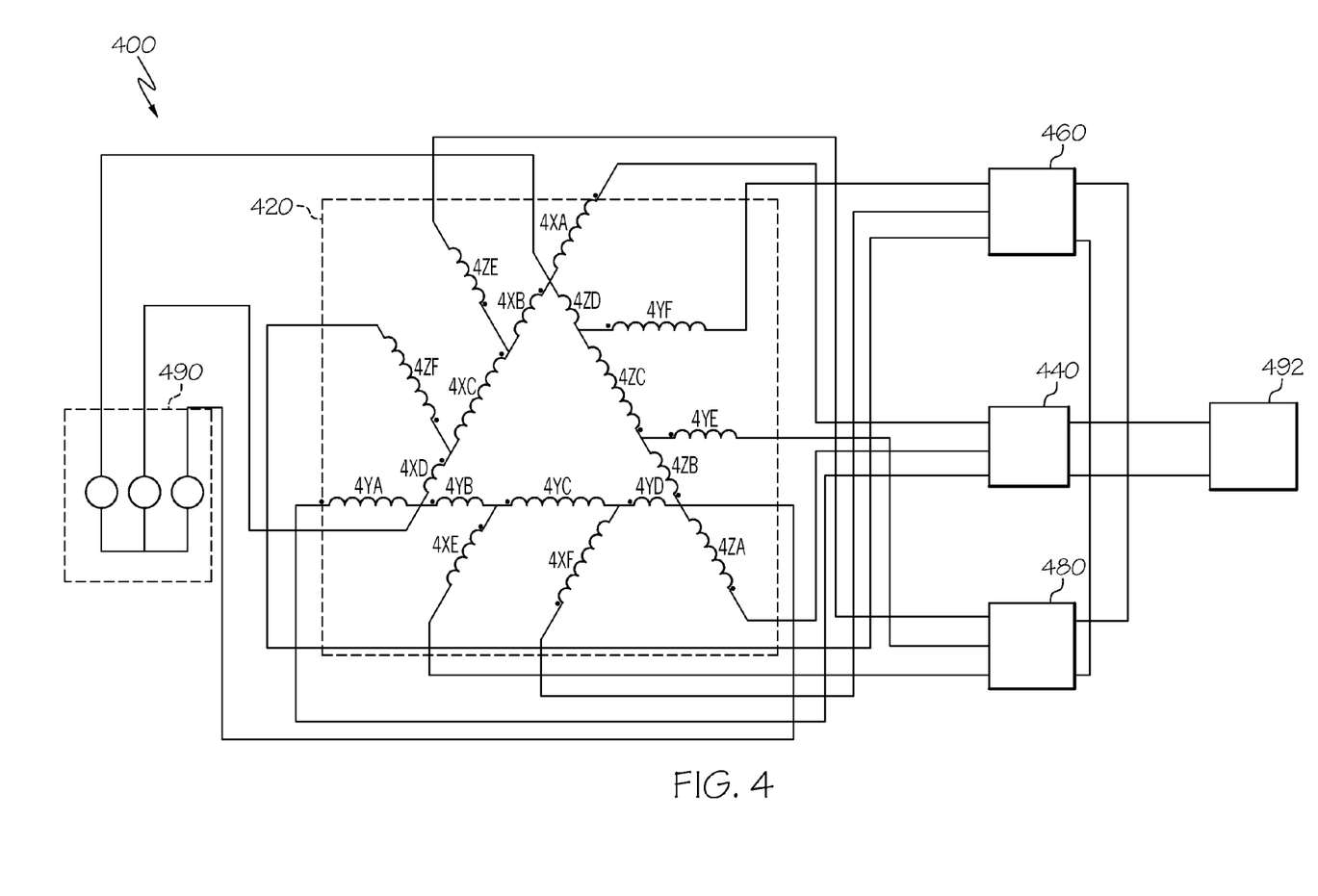
FIG. 4 is a schematic diagram of an AC-to-DC power converter in accordance with a second embodiment of the invention.

Referring now to FIG. 4, an exemplary embodiment of an AC to DC converter 400 with a boost capability of 1.0:2.0 (input to output) is shown. The converter 400 may include an autotransformer 420, a main rectifier 440 and auxiliary rectifiers 460 and 480, In FIG. 4 the converter 400 is shown interconnected between a 3-phase power supply 490 and a DC load 492. The main rectifier 440 and the auxiliary rectifiers 460 and 480 may be conventional 6 pulse rectifiers. Just as the converter 100 is asymmetrical, the converter 400 is also asymmetrical.

The autotransformer 420 may include winding segment designated 4XA, 4XB, 4XC, 4XD, 4XD, 4XE, 4XF, 4YA, 4YB, 4YC, 4YD, 4YD, 4YE, 4YF, 4zA, 4ZB, 4ZC, 4ZD, 4ZE, and 4ZF. The winding segments may have turns ratios as shown in the following Table 3.

TABLE 3

| Winding Segment | Turns Ratio |
| --- | --- |
| 4XA | 0.618 |
| 4XB | 0.1804 |
| 4XC | 0.7766 |
| 4XD | 0.0431 |
| 4XE | 0.4660 |
| 4XF | 0.6897 |
| 4YA | 0.618 |
| 4YB | 0.1804 |
| 4YC | 0.7766 |
| 4YD | 0.0431 |
| 4YE | 0.4660 |
| 4YF | 0.6897 |
| 4ZA | 0.618 |
| 4ZB | 0.1804 |
| 4ZC | 0.7766 |
| 4ZD | 0.0431 |
| 4ZE | 0.4660 |
| 4ZF | 0.6897 |

Figure 5:
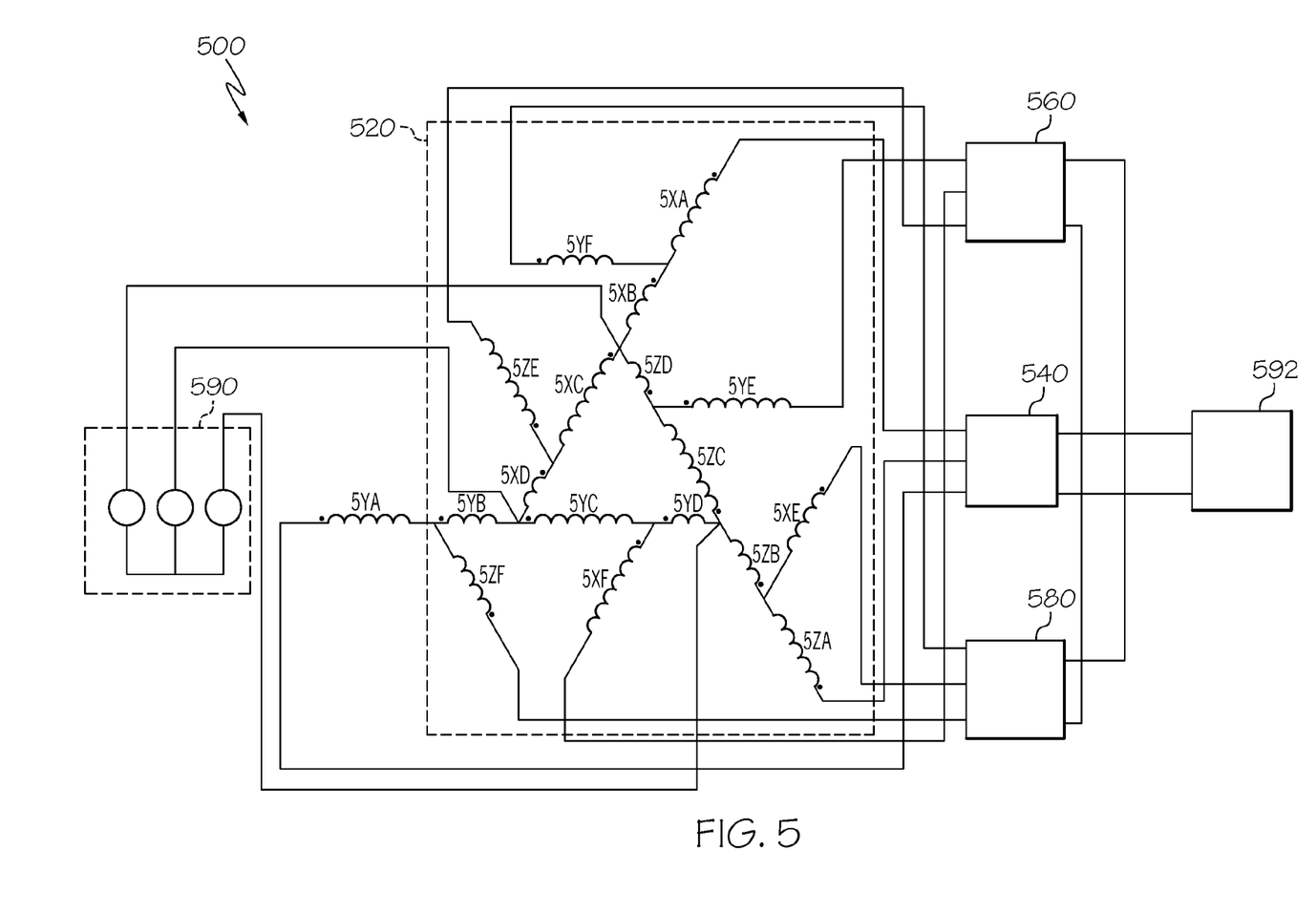
FIG. 5 is a schematic diagram of an AC-to-DC power converter in accordance with a third embodiment of the invention.

Referring now to FIG. 5, an exemplary embodiment of an AC to DC converter 500 with a boost capability of 1.0:2.0 (input to output) is shown. The converter 500 may include an autotransformer 520, a main rectifier 540 and auxiliary rectifiers 560 and 580, In FIG. 5 the converter 500 is shown interconnected between a 3-phase power supply 590 and a DC load 592. The main rectifier 540 and the auxiliary rectifiers 560 and 580 may be conventional 6 pulse rectifiers. Just as the converter 100 is asymmetrical, the converter 500 is also asymmetrical.

The autotransformer 420 may include winding segment designated 5XA, 5XB, 5XC, 5XD, 5XD, 5XE, 5XF, 5YA, 5YB, 5YC, 5YD, 5YD, 5YE, 5YF, 5ZA, 5ZB, 5ZC, 5ZD, 5ZE, and 5ZF. The winding segments may have turns ratios as shown in the following Table 4.

TABLE 4

| Winding Segment | Turns Ratio |
| --- | --- |
| 5XA | 0.3324 |
| 5XB | 0.2856 |
| 5XC | 0.9569 |
| 5XD | 0.0431 |
| 5XE | 0.4660 |
| 5XF | 0.6897 |
| 5YA | 0.3324 |
| 5YB | 0.2856 |
| 5YC | 0.9569 |
| 5YD | 0.0431 |
| 5YE | 0.4660 |
| 5YF | 0.6897 |
| 5ZA | 0.3324 |
| 5ZB | 0.2856 |
| 5ZC | 0.9569 |
| 5ZD | 0.0431 |
| 5ZE | 0.4660 |
| 5ZF | 0.6897 |

It should be understood, of course, that the foregoing relates to exemplary embodiments of the invention and that modifications may be made without departing from the spirit and scope of the invention as set forth in the following claims.

We claim:

1. A multi-phase AC-to-DC converter comprising:
a main rectifier;
a first auxiliary rectifier;
a second auxiliary rectifier; and
an autotransformer coupled with the main rectifier, the first auxiliary rectifier and the second auxiliary rectifier,
the autotransformer including;
a first winding assembly including:
a primary terminal coupled with an AC power source,
a main secondary terminal coupled with the main rectifier,
a first auxiliary secondary terminal coupled with the first auxiliary rectifier, and
a second auxiliary secondary terminal coupled with the second auxiliary rectifier,
wherein operational impedance between the primary terminal and the main secondary terminal is less than operational impedance between the primary terminal and either the first auxiliary secondary terminal or the second auxiliary secondary terminal, and
wherein operational impedance between the primary terminal and the first auxiliary secondary terminal is different from operational impedance between the primary terminal and the second auxiliary secondary terminal;
a second winding assembly including;
a primary terminal coupled with the AC power source,
a main secondary terminal coupled with the main rectifier,
a first auxiliary secondary terminal coupled with the first auxiliary rectifier, and
a second auxiliary secondary terminal coupled with the second auxiliary rectifier,
wherein operational impedance between the primary terminal and the main secondary terminal is less than operational impedance between the primary terminal and either the first auxiliary secondary terminal or the second auxiliary secondary terminal, and
wherein operational impedance between the primary terminal and the first auxiliary secondary terminal is different from operational impedance between the primary terminal and the second auxiliary secondary terminal; and
a third winding assembly including;
a primary terminal coupled with the AC power source,
a main secondary terminal coupled with the main rectifier,
a first auxiliary secondary terminal coupled with the first auxiliary rectifier, and
a second auxiliary secondary terminal coupled with the second auxiliary rectifier,
wherein operational impedance between the primary terminal and the main secondary terminal is less than operational impedance between the primary terminal of the third winding assembly and either the first auxiliary secondary terminal or the second auxiliary secondary terminal, and
wherein operational impedance between the primary terminal and the first auxiliary secondary terminal is different from operational impedance between the primary terminal and the second auxiliary secondary terminal.

2. The converter of claim 1 wherein one or more of the winding assemblies includes six sequentially-wound winding segments.

3. The converter of claim 2 wherein one or more of the winding assemblies is provided with at least one tap onto which a winding segment from another one of the winding assemblies is coupled.

4. The converter of claim 2 wherein each one of the winding assemblies is provided with at least two taps onto which winding segment from other ones of the winding assemblies are coupled.

5. The converter of claim 2 wherein one of the winding segments of the first winding assembly is interposed between one of the auxiliary rectifiers and the second winding assembly.

6. The converter of claim 5 wherein
one of the winding segments of the second winding assembly is interposed between one of the auxiliary rectifiers and the first winding assembly, and
one of the winding segments of the third winding assembly is interposed between one of the auxiliary rectifiers and the second winding assembly.

7. The converter of claim 1 wherein each of the winding assemblies is provided with a secondary terminal positioned at an end thereof.

8. An autotransformer for use in an AC to DC converter comprising:
a first winding assembly that includes a plurality of winding segments and at least one tap;
a second winding assembly that includes a plurality of winding segments and at least one tap;
a third winding assembly that includes a plurality of winding segments and at least one tap;

wherein at least one winding segment of the first winding assembly is connected to the at least one tap of the second winding assembly, wherein at least one winding segment of the second winding assembly is connected to the at least one tap of the third winding assembly, and wherein at least one winding segment of the third winding assembly is connected to the at least one tap of the first winding assembly, wherein the first winding assembly includes six winding segments being sequentially wound as a first, a second, a third, a fourth, a fifth and a sixth winding segment, wherein the second, third and fourth winding segments of the first winding assembly have turns ratios of one of:
0.0959, 0.7238, and 0.4660, respectively when a collective length of the second, third and fourth winding segment is normalized to unity, and
0.1804, 0.7766, and 0.0431, respectively when a collective length of the second, third and fourth winding segments is normalized to unity, wherein the second winding assembly includes six winding segments being sequentially wound as a first, a second, a third, a fourth, a fifth and a sixth winding segment, wherein the second, third and fourth winding segments of the second winding assembly have turns ratios of one of:
0.0959, 0.7238, and 0.4660, respectively when a collective length of the second, third and fourth winding segment is normalized to unity, and
0.1804, 0.7766, and 0.0431, respectively when a collective length of the second, third and fourth winding segment is normalized to unity, wherein the third winding assembly includes six winding segments being sequentially wound as a first, a second, a third, a fourth, a fifth and a sixth winding segment, wherein the second, third and fourth winding segments of the third winding assembly have turns ratios of one of:
0.0959, 0.7238, and 0.4660, respectively when a collective length of the second, third and fourth winding segment is normalized to unity, and
0.1804, 0.7766, and 0.0431, respectively when a collective length of the second, third and fourth winding segments is normalized to unity.

9. The autotransformer of claim 8,
wherein one of the winding segments of the first winding assembly is coupled with a second tap of the second winding assembly,
wherein one of the winding segments of the second winding assembly is coupled with a second tap of the third winding assembly, and
wherein one of the winding segments of the third winding assembly is coupled with a second tap of the first winding assembly.

10. The autotransformer of claim 8,
wherein one of the winding segments of the third winding assembly is coupled with a second tap of the second winding assembly,
wherein one of the winding segment of the first winding assembly is coupled with a second tap of the third winding assembly, and
wherein one of the winding segments of the second winding assembly is coupled with a second tap of the first winding assembly.

11. The autotransformer of claim 8,
wherein the first, the fifth and the sixth winding segments of the first winding assembly have turns ratios of 0.618, 0.4660 and 0.6807, respectively, relative to unity, wherein the first, the fifth and the sixth winding segments of the second winding assembly have turns ratios of 0.618, 0.4660 and 0.6807, respectively, relative to unity, and wherein the first, the fifth and the sixth winding segments of the third winding assembly have turns ratios of 0.618, 0.4660 and 0.6807, respectively, relative to unity.

12. An autotransformer for use in an AC to DC converter comprising:
a first winding assembly that includes a plurality of winding segments and at least one tap;
a second winding assembly that includes a plurality of winding segments and at least one tap;
a third winding assembly that includes a plurality of winding segments and at least one tap;
wherein at least one winding segment of the first winding assembly is connected to the at least one tap of the second winding assembly,
wherein at least one winding segment of the second winding assembly is connected to the at least one tap of the third winding assembly,
wherein at least one winding segment of the third winding assembly is connected to the at least one tap of the first winding assembly,
wherein the first winding assembly includes six winding segments being sequentially wound as a first, a second, a third, a fourth, a fifth and a sixth winding segment.
wherein the third and fourth winding segments of the first winding assembly have turns ratios of 0.9569 and 0.0431, respectively when a collective length of the third and fourth winding segments is normalized to unity,
wherein the second winding assembly includes six winding segments being sequentially wound as a first, a second, a third, a fourth, a fifth and a sixth winding segment.
wherein the third and fourth winding segments of the second winding assembly have turns ratios of 0.9569 and 0.0431, respectively, when a collective length of the third and fourth winding segment is normalized to unity.
wherein the third winding assembly includes six winding segments being sequentially wound as a first, a second, a third, a fourth, a fifth and a sixth winding segment.
wherein the third and fourth winding segments of the third winding assembly have turns ratios of 0.9569 and 0.0431, respectively when a collective length of the third and fourth winding segments is normalized to unity.

13. The autotransformer of claim 12,
wherein the first, the second, the fifth and the sixth winding segments of the first winding assembly have turns ratios of 0.3324, 0.2856, 0.4660 and 0.6897, respectively, relative to unity.
wherein the first, the second, the fifth and the sixth winding segments of the second winding assembly have turns ratios of 0.3324, 0.2856, 0.4660 and 0.6897, respectively, relative to unity, and
wherein the first, the second, the fifth and the sixth winding segments of the third winding assembly have turns ratios of 0.3324, 0.2856, 0.4660 and 0.6897, respectively, relative to unity.

* * * * *